3,146,134
METHOD OF FORMING TUNGSTEN SHAPES FROM SPRAYED METAL PREFORMS AND THE ARTICLES RESULTING THEREFROM

Theodore Pacala, Richard H. Singleton, and James E. Twyman, all of Indianapolis, Ind., assignors to General Motors Corporation, Detroit, Mich., a corporation of Delaware
No Drawing. Filed Sept. 18, 1961, Ser. No. 138,588
7 Claims. (Cl. 148—20.3)

This invention relates to methods for forming tungsten shapes from sprayed metal preforms and the articles resulting therefrom and more particularly to methods for improving the physical and mechanical properties of arc-plasma sprayed tungsten bodies.

Hollow tungsten bodies are being made at the present time by cold pressing tungsten powder at extremely high pressures followed by a very high temperature sintering treatment to produce a forging blank. It has been found however that such processing has very poor reliability in that the majority of the pieces break during forging. It is believed that the poor reliability results from non-uniformity of density inherent in this method since the pressure during cold pressing is less near the center of the cross section than on the surface and since the sintering produces a high level of shrinkage, the density going from about 60% in the green state to about 90% in the sintered state. In addition, the high sintering temperatures required result in high manufacturing costs.

It is accordingly an object of our invention to provide a method for producing tungsten bodies from sprayed metal preforms, which bodies have improved physical and mechanical properties; it is a further object of our invention to provide a method for heat treating sprayed tungsten preforms to form a body having high strength, density and hot ductility properties; it is a still further object of our invention to provide an arc-plasma sprayed tungsten body having improved physical properties by subjecting the sprayed metal preform to a heat treatment operation for increasing the strength, density and hot ductility of the material followed by a forging operation for obtaining the final configuration; it is yet another object of our invention to provide an arc-plasma sprayed tungsten body having improved physical properties.

These and other objects of our invention are obtained by sintering the arc-plasma sprayed metal preform at a temperature of from about 3500° F. to 4000° F. for a period of at least about two hours followed by cooling in the absence of oxygen. Applicants' method and objects will be more readily understood from the following description.

As a result of extensive research and development effort, applicants have found that tungsten preforms made by using arc-plasma spray techniques may be processed to produce high density, high strength bodies having a high degree of uniformity and reliability. The arc plasma spray technique may be that well known in the art and forms no part of our invention, one such technique being disclosed in the assignee's co-pending application S.N. 69,868, filed November 17, 1960, in the name of Harold E. Barker and entitled "Forming Articles by Arc-Plasma Spraying."

It has been found that as-sprayed tungsten preform not only results in a body having a high degree of uniformity and reliability insofar as physical and mechanical properties are concerned but that when heat treated in accordance with our invention produces a body having considerably increased density and tensile strength as well as a level of hot ductility as to enable the material to be readily forged. More specifically, it has been found that these improved characteristics result from heat treating the preform at a temperature of from 3500 to 4000° F. for a period of at least about two hours, a sintering temperature of 3750° F. being preferred. It has also been found that sintering in a moist hydrogen atmosphere produces a preform of the same density but with a strength that is 15 to 20% higher than that resulting with the use of dry hydrogen, the preferred moisture content of the hydrogen being that which corresponds to a dew point of 0° F. Also, it has been found that high temperature vacuum treatment fails to produce the strength and density properties obtainable by the described heat treating method. Heat treating at temperatures below about 3500° F. results in a material which is not forgeable and is susceptible to wide spread cracking. Treatment at temperatures higher than about 4000° F. has been found to be without real benefit. A comparison of physical and mechanical properties of various heat treatment methods with the properties of the as-sprayed preform is shown in Table I.

Table I

| Atmosphere | Temp., °F. | Time, hrs. | Tensile strength, p.s.i.[1] | Density percent theoretical | Hardness | Grain size[2] | Forgeability at 3000° F. |
|---|---|---|---|---|---|---|---|
| As sprayed | | | 22,000 | 84 | 210 | | Poor. |
| H₂ (moist, 0° F. D.P.) | 2,600 | 3 | 36,000 | 86 | 215 | 7 | Do. |
| H₂ (moist, 0° F. D.P.) | 3,750 | 2 | 75,000 | 92 | 260 | 3½ | Good. |
| H₂ (dry, D.P.) | −100 3,750 | 2 | 62,000 | 92 | | | Do. |
| Vacuum | 4,500 | 8 | 33,000 | 92 | 250 | 2 | Do. |
| Do | 3,750 | 2 | | 87 | | | |

[1] Tensile strength as obtained by ring crush test method.
[2] Grain Size—ASTM standard size except at 500X.

It is apparent from Table I that the heat treatment in moist hydrogen at a temperature of about 3750° F. yields the strongest product having a good hot ductility characteristics, the use of dry hydrogen producing a slightly weaker product. It may also be noted that the vacuum sintering at 4500° F. produces a considerably weaker material.

Thus it is apparent that sintering in moist hydrogen densifies and improves the physical properties of arc-plasma sprayed tungsten to a greater degree than in either vacuum or dry hydrogen at the same temperature. Though the exact mechanism for this is unknown, it may be theorized that vapor phase transport of metal from one side to another becomes possible through the formation of a volatile tungsten oxide formed by the following reversible reaction:

$$W + XH_2O \rightleftharpoons WO_x + XH_2$$

The heat treatment of tungsten arc-plasma sprayed preforms in the described manner results in a preform having excellent heat ductility and therefore being readily susceptible to forging for producing articles of the desired configuration and dimension. It has been found that the heat treated preform is readily reduced as much as 50% by forging when the preform is preheated within the range of 2500° F. to 3500° F. This preheating may be accomplished in either a hydrogen atmosphere or other non-oxidizing gas, i.e., argon, nitrogen, or by rapidly heating the metal body in air using an induction coil, the heated body being transferred as rapidly as possible to the forge hammer or press which uses heated dies. In Table II there is shown a comparison of tungsten preforms together with the forged body resulting from a preform treated in accordance with the herein described invention. It is apparent that the preform resulting from heat treating arc-plasma sprayed bodies is superior to that resulting from using known processes.

*Table II*

|  | Cold pressed and sintered | Hot pressed | 3,750° F., 2 hrs., H$_2$ (moist) | 3,750° F., 2 hrs., H$_2$ (moist) forged with 50% reduction |
|---|---|---|---|---|
| Ultimate tensile strength,[1] p.s.i. | 60,000 | 55,000 | 75,000 | 115,000 |
| Density, percent of theor. | 92 | 90 | 92 | 97 |
| Forgeability | Good | Good | Good | |

[1] Tensile strength obtained by the ring crush test method.

From the above description it is apparent that applicants have discovered a relatively simple and highly effective method for producing hollow tungsten shapes from arc-sprayed metal preforms. While modifications of applicants' method are possible, such modifications are within the intended scope of applicants' invention as defined by the claims which follow.

We claim:

1. The method of treating an arc-plasma sprayed tungsten hollow body to produce a body having high strength, density and hot ductility comprising the steps of heating the body in a hydrogen atmosphere at a temperature of from about 3500° F. to about 4000° F. for a period of at least about 2 hours and cooling said preform without exposure to air.

2. The method as set forth in claim 1 wherein the temperature is maintained at about 3750° F.

3. The method as set forth in claim 2 wherein water vapor is present in an amount corresponding to a dew point of about 0° F. to improve the strength, density and hot ductility characteristics of the body.

4. The method of treating an arc-plasma sprayed tungsten hollow body to produce a body having high strength, density and hot ductility comprising the steps of heating the body in a moist hydrogen atmosphere at a temperature of from about 3500° F. to about 4000° F. for a period of at least about two hours and cooling said body without exposure to air, the water vapor being present in an amount corresponding to a dew point of about 0° F.

5. The method as set forth in claim 2 including the steps of preheating the treated body to a temperature of from about 2500° F. to about 3500° F. and forging the body to the desired configuration.

6. The method as set forth in claim 5 wherein the preheating temperature is about 3000° F.

7. An arc-plasma sprayed tungsten hollow body having high strength, density and hot ductility characteristics heat treated in accordance with the method of claim 1.

References Cited in the file of this patent

UNITED STATES PATENTS

| 2,076,381 | Millner et al. | Apr. 6, 1937 |
| 2,308,700 | Mansfield | Jan. 19, 1943 |

OTHER REFERENCES

Welding Engineer, February 1959 (pages 50–51 relied upon).

Journal of Metals, vol. 11, January 1959 (pages 40–42 relied upon).

UNITED STATES PATENT OFFICE
CERTIFICATE OF CORRECTION

Patent No. 3,146,134　　　　　　　　　　　　　　August 25, 1964

Theodore Pacala et al.

It is hereby certified that error appears in the above numbered patent requiring correction and that the said Letters Patent should read as corrected below.

Columns 1 and 2, Table 1, under the heading "Atmosphere", line 4 thereof, for "$H_2$(dry, D.P.)" read -- $H_2$(dry, -100° F. D.P.) --; same table, under the heading "Temp., ° F." line 4 thereof, strike out -100.

Signed and sealed this 8th day of December 1964.

(SEAL)
Attest:

ERNEST W. SWIDER　　　　　　　　　　　　　　EDWARD J. BRENNER
Attesting Officer　　　　　　　　　　　　　　Commissioner of Patents